(12) United States Patent
Thomas

(10) Patent No.: US 6,351,908 B1
(45) Date of Patent: Mar. 5, 2002

(54) AUTOMATED DEER SCARECROW

(76) Inventor: James Wendell Thomas, 6253 Tall Pine Rd., Jay, FL (US) 32565

( * ) Notice: Subject to any disclaimer, the term of this patent is extended or adjusted under 35 U.S.C. 154(b) by 0 days.

(21) Appl. No.: 09/365,994

(22) Filed: Aug. 3, 1999

(51) Int. Cl.[7] .................... A01M 29/00; A01M 29/04
(52) U.S. Cl. .................... 43/1; 116/22 A; 340/384.1
(58) Field of Search .................... 43/1, 26.1; 116/22 A; 361/232; 340/384.1

(56) References Cited

U.S. PATENT DOCUMENTS

| | | | |
|---|---|---|---|
| 726,131 A | | 4/1903 | Barnes |
| 733,778 A | * | 7/1903 | Weber |
| 1,357,032 A | | 10/1920 | Davis |
| 2,788,762 A | | 4/1957 | Wright |
| 2,922,999 A | | 1/1960 | Carlin |
| 3,799,105 A | * | 3/1974 | Porter ....................... 116/22 A |
| 4,074,653 A | * | 2/1978 | Pember ...................... 116/22 A |
| 4,109,605 A | * | 8/1978 | Bachli ....................... 116/22 A |
| 4,131,079 A | * | 12/1978 | Rousseau, Jr. et al. .... 116/22 A |
| 4,598,660 A | * | 7/1986 | Konzak ...................... 116/22 A |
| 4,656,770 A | * | 4/1987 | Nuttle ............................. 43/2 |
| 4,736,907 A | * | 4/1988 | Steffen ....................... 244/1 R |
| 4,890,571 A | | 1/1990 | Gaskill |
| 5,148,621 A | * | 9/1992 | Rosen ............................. 43/1 |
| 5,425,192 A | * | 6/1995 | Negre ............................. 43/1 |
| 5,452,536 A | * | 9/1995 | Chatten ........................... 43/1 |
| 5,977,866 A | * | 11/1999 | Joseph, Jr. et al. ...... 340/384.1 |
| 5,986,551 A | * | 11/1999 | Pueyo et al. ................ 340/573 |

* cited by examiner

Primary Examiner—Kurt Rowan
(74) Attorney, Agent, or Firm—Robert J. Veal; Robert M. Jackson; Burr & Forman LLP

(57) ABSTRACT

The present invention provides an apparatus for scaring deer and other unwanted animals away from agricultural crop production areas using unnatural audible and visual stimuli. The invention generally comprises a substantially hollow housing having a removable top portion mounted atop a rigid support frame member. The exterior of the housing includes a plurality of light and sound emitting devices attached thereto, in addition to at least two rotatably mounted elongated arms having a hollow interior portion with a flowable metal particulate contained therein for producing unnatural sounds upon rotation of such for scaring deer and other unwanted animals away. The interior portion of the housing includes an electronic controller in electrical connection with a power relay for energizing the aforementioned electrical components, along with a motor assembly for imparting rotational motion to the rotatably mounted elongated arms on the exterior of the housing. The apparatus is generally powered by a battery connected to a solar charging panel.

23 Claims, 4 Drawing Sheets

AUTOMATED DEER SCARECROW

FIELD OF THE INVENTION

The present invention relates to apparatuses and devices used to scare deer and other unwanted animals away from agricultural areas. More particularly, the present invention relates to scarecrow type apparatuses and devices placed in agricultural fields to scare away unwanted animals tending to damage crops. With even greater particularity, the present invention relates to a powered scarecrow capable of generating unnatural audible and visual stimuli for scaring unwanted animals away from agricultural areas.

BACKGROUND OF THE INVENTION

The protection of agricultural production areas from various animals having a tendency to damage the aforementioned areas is an age-old problem. Farmers, in an attempt to protect crop producing areas, have utilized various methods and apparatuses to both keep out and scare away unwanted animals from crop producing areas. Primarily, in order to keep larger animals capable of completely devastating a crop producing area out of the area, farmers have utilized fencing. However, wild deer, which are larger animals capable of completely destroying crops in a particular area, are known for easily jumping over such fences, thus rendering the fences useless against such animals. Further contributing to this problem is the tendency of wild deer to travel and feed in numbers, which allows for the destruction and/or consumption of agricultural crops more rapidly.

In view of the substantial cost associated with building fences around crops tall enough to preclude deer from jumping into the crop producing areas, farmers have generally turned to the tactic of scaring deer away from such areas. Attempting to scare deer away from crops has been accomplished through various apparatuses and devices. U.S. Pat. No. 4,980,571 to Gaskill teaches a DEER SCARECROW having an essentially rectangular body with arms and a simulated head extending therefrom. Streamers attached to the arms and lower body portion of the scarecrow wave in the wind, thereby creating visual stimuli claimed to scare away deer. This apparatus also includes a noise-making device inserted within a sewn pocket of the scarecrow, along with a scent emitting device. Although claimed to scare away deer using the streamers, the noise emitting device sewn into a pocket, and the scent emitting device; wild deer, which have been know to intelligently distinguish patterns, are likely not scared by this apparatus. Inasmuch as the scarecrow itself is completely stationary, the streamers blowing in the wind are likely synonymous with leaves and the like blowing on trees. Further, a noise emitting device limited in size to that which can be sewn into a pocket of a scarecrow is also likely insufficient to effectively scare away deer.

Another apparatus for scaring unwanted animals away from agricultural areas is shown in U.S. Pat. No. 3,799,105 to Porter. This apparatus utilizes a vertically oriented driven rotating structure having a plurality of weighted lines attached thereto for rotation about the structure. Upon rotation of the structure, the weighted lines are centrifugally extended in accordance with the rotation speed of the structure. Attached to the terminating end of the lines are sound producing weights, which emit sound vibrations in accordance with the rotation speed of the structure. A control means varies the extension of the lines and the rotation speed of the structure during operation. Again, however, deer seem to become accustomed, and thus not frightened by this type of apparatus. Therefore, there exists a need for an apparatus to effectively scare deer and other wild animals away from agricultural areas using unnatural audible and visual stimuli, such that crop damage is minimized and crop production is maximized.

SUMMARY OF THE INVENTION

It is an object of the present invention to provide a reliable apparatus for scaring deer and other unwanted wild animals away from crop producing agricultural areas using unnatural audible and visual stimuli. It is a further object of the present invention to provide a reliable apparatus for scaring deer and other unwanted animals away from agricultural areas using a metal on metal type audible sound calculated to effectively scare deer. It is yet a further object of the present invention to provide an apparatus for scaring deer and other wild animals away from crop producing areas using a combination of electrically operated and electronically controlled unnatural audible and visual stimuli at various intervals of time. It is a further object of the present invention to provide an apparatus for scaring deer and other unwanted wild animals, capable of sustained operation in remote areas.

BRIEF DESCRIPTION OF THE DRAWINGS

A device/apparatus embodying the features of the present invention is depicted in the accompanying drawings, which form a portion of this disclosure, wherein.

DETAILED DESCRIPTION OF THE PREFERRED EMBODIMENT

Figure 1:
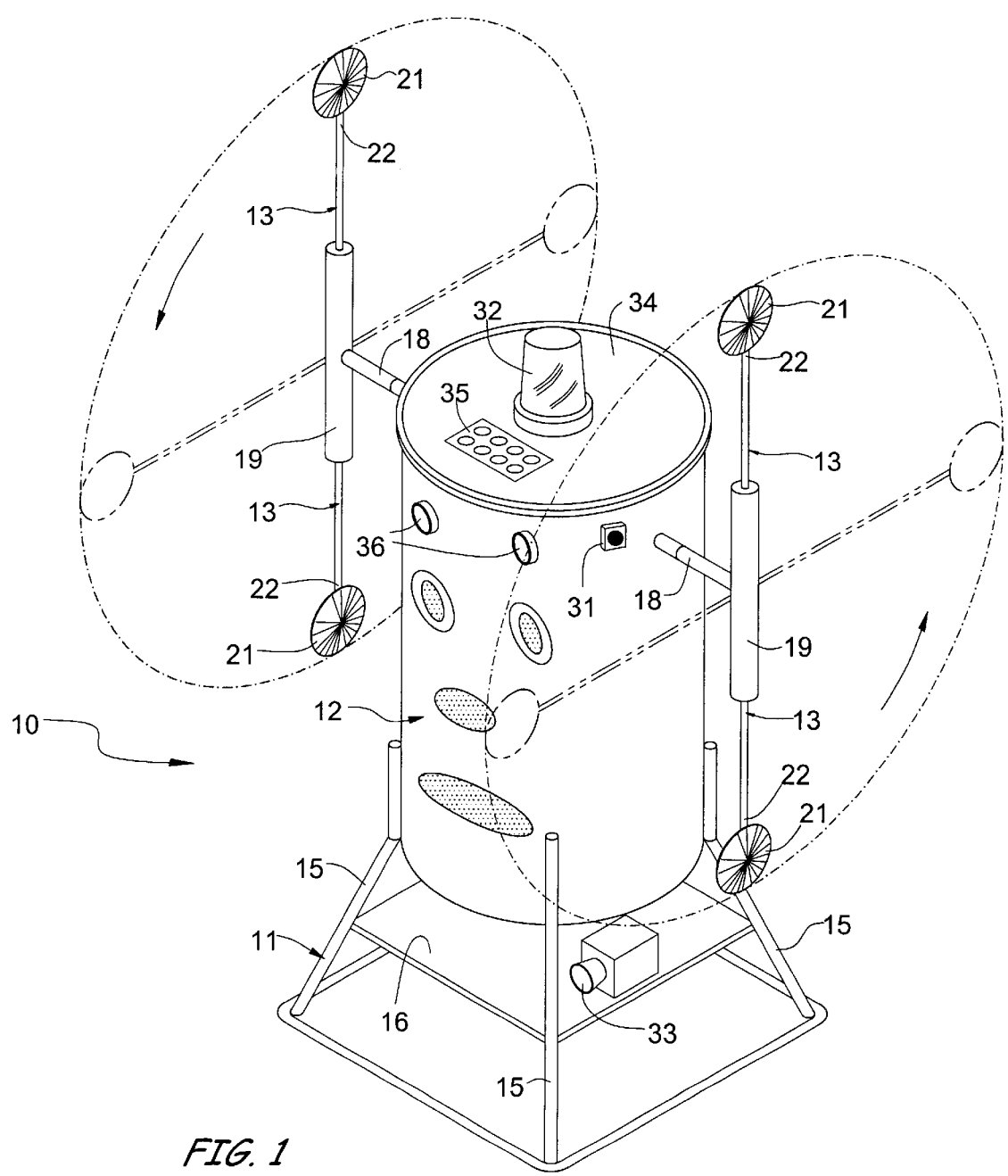
FIG. 1 is a perspective view of the apparatus.
Figure 2:
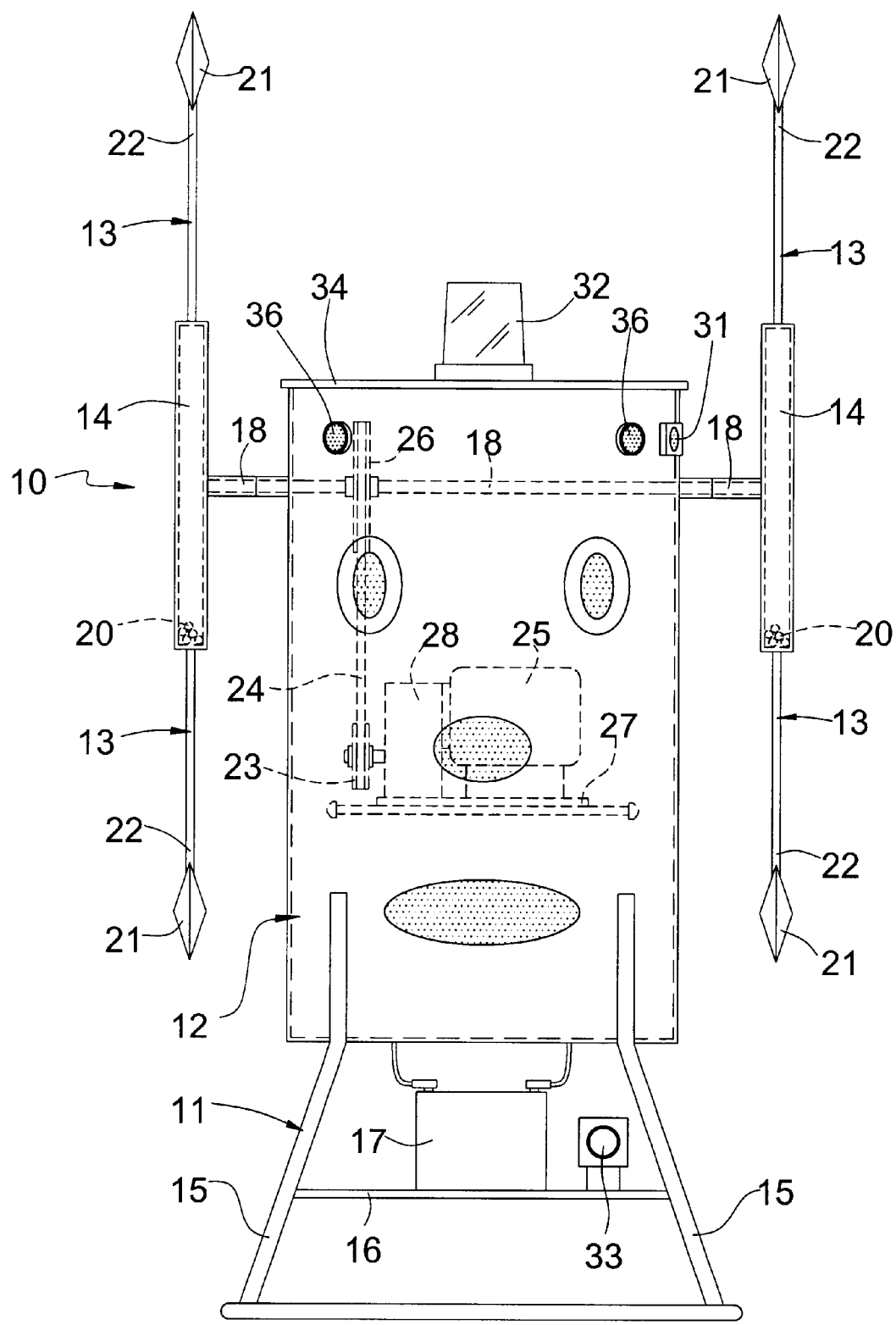
FIG. 2 is a front elevational view.
Figure 3:
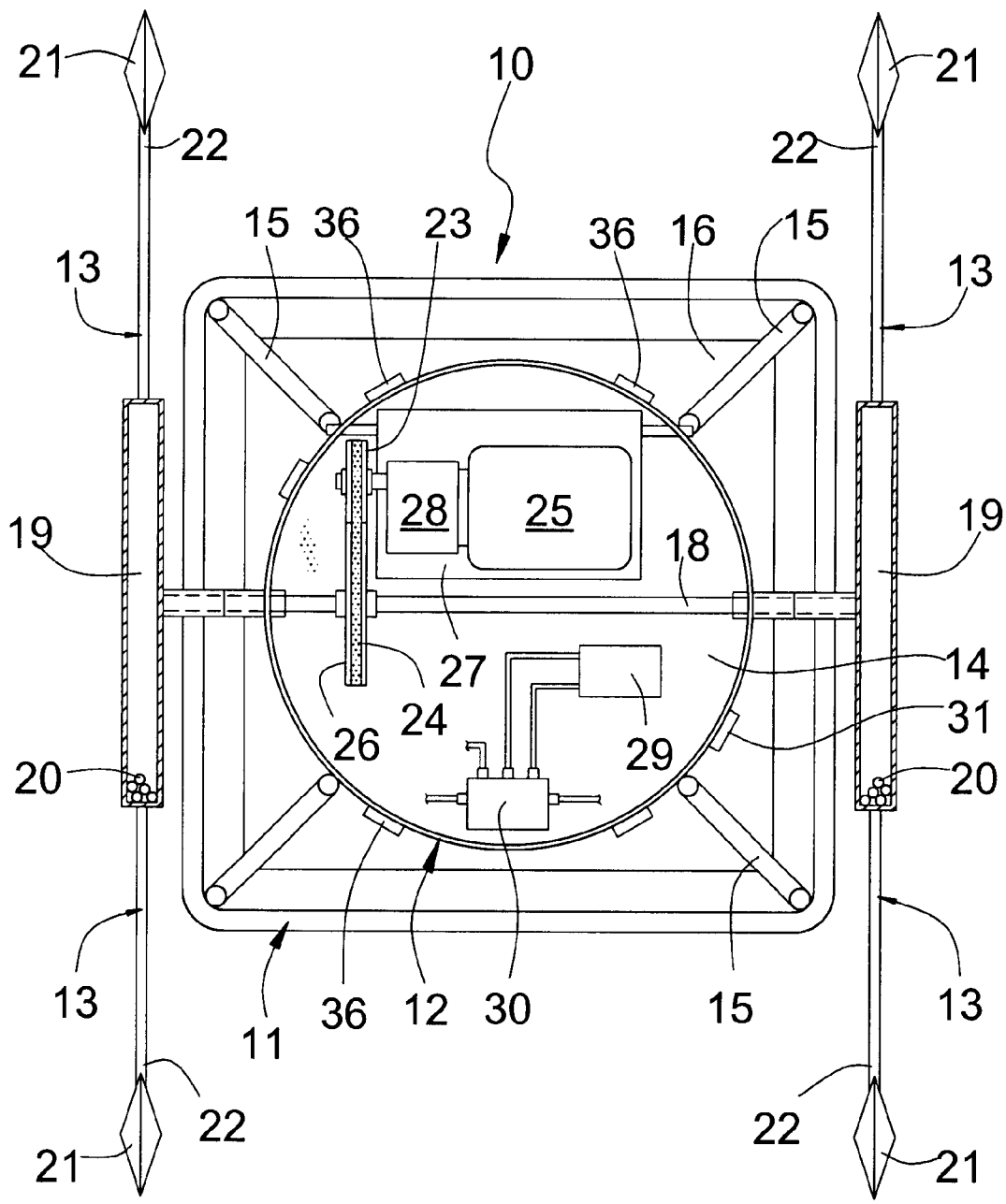
FIG. 3 is a top plan view of the apparatus with the top portion of the housing removed.

Referring to the drawings for a better understanding of the principles of operation and structure of the invention, it will be seen that FIG. 1 shows a perspective view of the apparatus 10 for scaring deer and other unwanted animals away from agricultural crops. Apparatus 10 generally comprises rigid frame assembly 11 supporting an upright cylindrical housing 12 having a removable top portion 34 for accessing the interior of housing 12. Housing 12 has at least two rotating arm members 13 extending therefrom for rotation in a substantially vertical plane. Additionally, housing 12 includes a plurality of devices for producing audible and visual stimuli attached to the exterior of housing 12. Frame assembly 11 generally includes four vertically oriented support legs 15, which are structurally interconnected to one another proximate the ground-engaging ends of legs 15, thereby forming the square base portion 37 of frame assembly 11. Also included in frame assembly 11 is a substantially square planar utility shelf 16, which is interposed between legs 15 and rigidly attached thereto for supporting a power supplying battery 17. Although shelf 16 generally supports power supply or battery 17, shelf 16 is also useful for storing additional tools, replacement parts, and as a support step for accessing the top portion 34 and interior of housing 12 by the user for maintenance and repairs.

Rotating arm members 13, which are generally manufactured from a rigid material such as metal, are rotatably supported by horizontal shaft 18, which extends through housing 12 and engages arm members 13 on the outer sides of housing 12. Upon rotation of shaft 18, arm members 13 positioned on each side of housing 12 concomitantly rotate in a substantially vertical plane. Arm members 13 structurally include an intermediate substantially hollow elongated portion 19 having a flowable particulate 20 contained therewithin for producing a noise upon rotation of arm members 13. Particulate 20, when consisting primarily of dense metal objects such as heavy nuts and bolts, has been shown to produce audible metal on metal type sounds particularly effective in scaring away large wild animals such as deer. Containers 21, affixed to the distal ends 22 of arms 13, provide additional visual stimuli upon rotation of arms 13 for scaring away deer and other unwanted animals. Containers 21 are generally painted with white stripes or spots, which upon rotation of arms 13 has been shown to represent a deer running, which generally encourages other deer and wild animals in proximity to instinctively run. Containers 21 also can be equipped with reflective materials, such that upon rotation of arms 13 the reflective materials intermittently reflect light, again creating an unnatural effect and scaring away deer and other unwanted animals.

Figure 4:
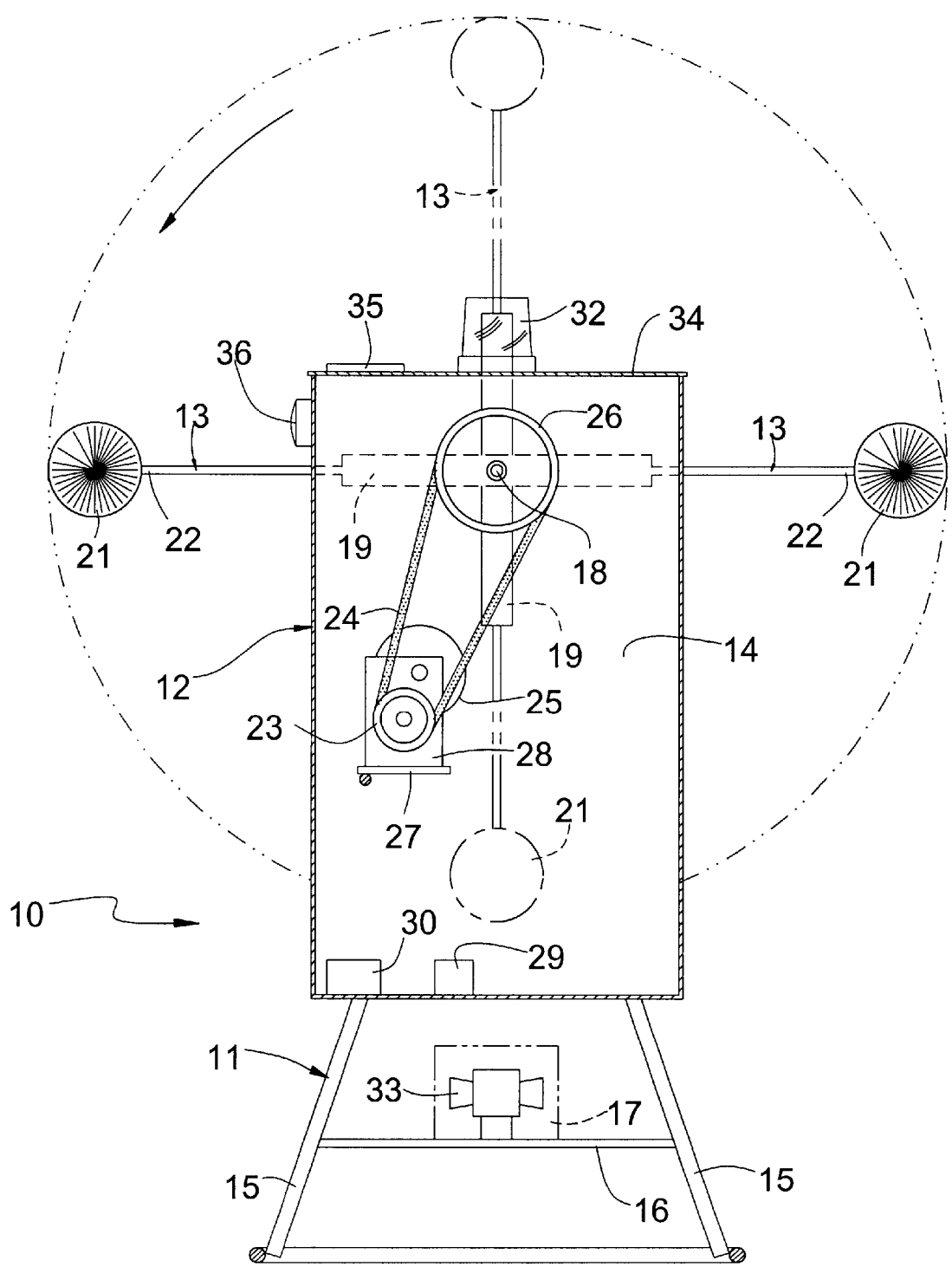
FIG. 4 is a sectional view taken generally along line 4—4 of FIG. 2.

Housing 12 includes a hollow interior cylindrical portion 14 for containing the operational components of apparatus 10, as shown in FIGS. 4 & 5. The operational components contained within the hollow interior portion 14 of housing 12 generally include the mechanical assembly used to rotate arms 13 and the electrical components used to regulate the operation of apparatus 10. The mechanical components used to rotate arm members 13 include a shaft drive pulley 23 concentrically mounted on shaft 18 in engagement with a drive belt 24. An electric motor 25 having a drive belt pulley 26 attached thereto through gearbox 28 frictionally engages drive belt 24, thereby imparting rotation to shaft 18 upon actuation of electric motor 25. Rotation of shaft 18, as stated above, causes arms 13 on the exterior of housing 12 to concomitantly rotate. Electric motor 25 is rigidly mounted to motor plate 27, which is pivotally mounted to the interior portion 14 of housing 12, such that the weight of motor 25 causes motor plate 27 to pivot away from shaft 18, thereby automatically tensioning drive belt 24 and requiring no belt tensioning adjustment. The electrical components contained within housing 12 typically include an electronic controller 29 having an on board timer and a power relay 30. Electronic controller 29 and power relay 30, both of which are generally mounted to the interior portion 14 of housing 12, are in electrical connection with battery 17. Electronic controller 29 operates to energize power relay 30 at predetermined or random intervals in order to initiate operation of the electrical and mechanical components of apparatus 10. Power relay 30, when activated by electronic controller 29, supplies electrical power from battery 17 to motor 25 and the remaining components of apparatus 10 for a predetermined or random period of time.

The exterior surface 38 of housing 12 contains a plurality of devices for producing unnatural sounds and visual effects calculated to scare away deer and other unwanted animals. Generally speaking, the exterior physical appearance of housing 12 is designed to resemble human features in that eyes, a nose, and a mouth are painted thereon to scare deer and other unwanted animals. An electrically operated beeper 31, similar to that which is utilized by heavy machinery to indicate reverse movement, is mounted on the exterior of housing 12. Beeper 31, which is in electrical connection with electronic controller 29, emits a loud and unnatural beeping noise upon actuation of apparatus 10, which is calculated to scare deer and other unwanted animals away from the agricultural areas apparatus 10 is placed near. Also mounted on the exterior of housing 12 are a plurality of flashing lights 36, which are in electrical connection with electronic controller 29. The top portion 34 of housing 12, which is generally removable to allow for service of the components contained within interior portion 14 of housing 12, includes a rotating siren-type light 32 mounted thereon. Siren light 32, which is in electrical connection with electronic controller 29, emits a rotating luminous stream of light calculated to scare deer and other unwanted animals away from apparatus 10 upon actuation by electronic controller 29. Siren light 32 additionally reflects light off of the reflective surfaces of containers 21 affixed to the ends of arms 13, thereby again generating an unnatural and animal scaring visual stimuli. Immediately below the lower portion of housing 12 on shelf 16 is an electrically actuated pneumatic cannon 33 for producing a loud gun-like noise. Cannon 33, which is in electrical connection with electronic controller 29, intermittently produces a loud gun like noise when energized by electronic controller 29. This loud gun-like noise is also calculated to scare deer and other unwanted animals away from the agricultural areas in which apparatus 10 is placed.

The top portion 34 of housing 12 additionally includes a solar panel 35 capable of converting solar energy into electrical power. Solar panel 35, which is in electrical connection with battery 17, is utilized to charge battery 17 during daylight hours, thus extending the field life of battery 17 between charges. Utilization of charging solar panel 35 allows apparatus 10 to operate remotely without need for proximate electrical power to frequently charge or energize apparatus 10; therefore, apparatus 10 is capable of operating for prolonged periods of time in the field without charging.

In actual operation, apparatus 10 is placed proximate an agricultural area to be protected from large animals tending to damage or destroy agricultural crops. Electronic controller 29 can be selected to energize apparatus 10 at predetermined times or randomly. Inasmuch as deer and other unwanted animals have shown the capacity for retention of patterns, it is preferred that apparatus 10 be operated in random mode such that deer and other unwanted animals are not capable of anticipating the actuation of apparatus 10, thereby rendering the effectiveness of apparatus 10 minimal. Subsequent to placing apparatus 10 proximate the area to be protected, apparatus 10 is simply left alone to operate. Assuming operation in random mode, electronic controller 29 randomly sets a timer to count down. Upon expiration of the timer, electronic controller 29 energizes power relay 30 and again randomly sets the timer to count down. Upon reaching zero again, electronic controller 29 de-energizes power relay 30, thereby shutting down operation of apparatus 10, and again the timer is set to count down to the next actuation of apparatus 10.

During operation of apparatus 10, power relay 30 provides electrical current to electric motor 25 from battery 17. Rotation of electric motor 25 causes shaft 18 to concomitantly rotate via drive belt 34, thereby rotating arms 13 in a substantially vertical plane. This vertical rotation causes the metal particulate 20 within substantially hollow arm portion 19 to travel from one end to the other in accordance with the rotation of arm 13. During this motion, metal particulate 20 generally contacts the interior walls of substantially hollow arm portion 19, which is also manufactured from metal, thereby generating a metal on metal sound. This sound, which has been shown to be extremely effective in scaring deer and other unwanted animals away from agricultural areas, is a novel feature of the present invention. Additionally, rotation of arms 13 intermittently subjects the reflective surfaces of containers 21 to the light produced by siren light 32 as well as creating motion calculated to simulate deer running, both of which are generally known to scare deer and other animals away form the area. Power relay 30 additionally provides power to a number of sound and light emitting devices placed upon the exterior of housing 12 when actuated by electronic controller 29. Although battery 17 is drained of electrical storage during operation of apparatus 10, charging solar panel 35 is designed to replace the electrical power used by apparatus 10 to battery 17 during non-operational daylight hours.

It is to be understood that the form of the invention shown is a preferred embodiment thereof, and that various changes and modifications may be made therein without departing from the spirit of the invention or scope as defined in the following claims.

What is claimed is:

1. An apparatus for audibly and visually scaring unwanted animals away from designated areas comprising:
  a) a rigid support frame member having a housing affixed thereto;
  b) a power source;
  c) control means positioned within said housing for regulating the mechanical and electrical operation of said apparatus, said control means being in electrical connection with said power source;
  d) mechanically driven rotating means attached to said housing and in electrical connection with said control means for generating visual and audible stimuli to scare said unwanted animals, wherein said rotating means further comprises;
    an electric motor adjustably mounted within said housing, said motor being in electrical connection with said control means and having an output shaft extending therefrom, said output shaft having a drive belt pulley attached thereto;
    a rotatably mounted elongated shaft extending through said housing, said shaft having a shaft drive pulley rigidly mounted thereon within said housing for rotation therewith, said shaft drive pulley being in frictional engagement with said drive belt pulley via a drive belt; and
    at least two elongated arm members having a substantially hollow interior portion transversely mounted to the terminating ends of said shaft, said arm members having a plurality of noise producing particulate contained within said substantially hollow portion of said arm member and a container having visual stimuli for scaring animals thereon attached to the end portion of said arm member;
  e) electrically driven means attached to said housing and in electrical connection with said control means for producing visual stimuli to scare said unwanted animals; and
  f) electrically driven means attached to said housing and in electrical connection with said control means for producing audible stimuli to scare unwanted animals.

2. An apparatus for audibly and visually scaring unwanted animals away from designated areas as defined in claim 1, wherein said arm members and said noise producing particulate are manufactured from metal.

3. An apparatus for audibly and visually scaring unwanted animals away from designated areas as defined in claim 1, wherein said electrically driven means for producing visual stimuli to scare unwanted animals further comprises at least one intermittently active light source.

4. An apparatus for audibly and visually scaring unwanted animals away from designated areas as defined in claim 1, wherein said electrically driven means for producing audible stimuli to scare unwanted animals further comprises at least one electronic beeper.

5. An apparatus for audibly and visually scaring unwanted animals away from designated areas as defined in claim 1, wherein said control means further comprises an electrically operated timer in electrical connection with an operation engaging relay.

6. An apparatus for audibly and visually scaring unwanted animals away from designated areas as defined in claim 1, wherein said housing is painted to resemble human features.

7. An apparatus for audibly and visually scaring unwanted animals away from designated areas as defined in claim 1, further comprising a pneumatic gun in electrical connection with said control means for emitting a loud gun sound.

8. An apparatus for audibly and visually scaring unwanted animals away from designated areas as defined in claim 1, wherein said power source is a battery, said battery being in electrical connection with a solar powered battery charger mounted on said housing.

9. An apparatus for audibly and visually scaring unwanted animals away from designated areas, as defined in claim 1, wherein said control means intermittently energizes said mechanically driven rotating means, said electrically driven means for producing visual stimuli, and said electrically driven means for producing audible stimuli at predetermined intervals of time.

10. An apparatus for scaring deer and other animals away from cropland comprising:
  a) a rigid frame member having a housing mounted thereon, said housing being painted to resemble human features;
  b) an electronic controller in electrical connection with a battery mounted on said frame member, said controller having a timer and operation engaging relay;
  c) an electric motor mounted within said housing and being in electrical connection with said operation engaging relay, said motor having a drive belt engaging pulley attached thereto for rotation therewith;
  d) an elongated shaft rotatably mounted to said housing, said shaft having a drive pulley attached thereon, said drive pulley being in rotational engagement with said drive belt engaging pulley of said motor via a drive belt, such that said shaft rotates concomitantly with said electric motor;
  e) at least one substantially hollow metal arm member transversely affixed to the terminating ends of said shaft, said substantially hollow metal arm members containing a metal particulate within, said metal particulate producing an unpleasant sound within said hollow metal arm member upon rotation of said shaft;
  f) at least one light emitting device in electrical connection with said electronic controller for emitting unpleasant light;
  g) at least one sound emitting device in electrical connection with said electronic controller for emitting unpleasant sounds; and
  h) at least one pneumatic gun in electrical connection with said electronic controller for emitting a loud gun sound.

11. An apparatus for scaring deer and other animals away from cropland as defined in claim 10, wherein said electric motor is rigidly mounted to a pivotally mounted plate member, such that the weight of said motor urges said pivotally mounted plate member to pivot downward, thereby automatically tensioning said drive belt.

12. An apparatus for scaring deer and other animals away from cropland as defined in claim 10, further comprising a solar powered battery charger mounted to said housing, said solar charger being in electrical connection with said battery.

13. An apparatus for scaring deer and other animals away from cropland as defined in any one of claims 10–12, wherein said control means energizes said apparatus intermittently at predetermined intervals to scare away unwanted animals.

14. An apparatus for audibly and visually scaring unwanted animals away from designated areas comprising:
   a) a rigid support frame member having a housing affixed thereto;
   b) a power source;
   c) control means positioned within said housing for regulating the mechanical and electrical operation of said apparatus, said control means being in electrical connection with said power source;
   d) mechanically driven rotating means attached to said housing and in electrical connection with said control means for generating visual and audible stimuli to scare said unwanted animals;
   e) electrically driven means attached to said housing and in electrical connection with said control means for producing visual stimuli to scare said unwanted animals, wherein said electrically driven means for producing visual stimuli further comprises a plurality of flashing lights and at least one rotating siren type light; and
   f) electrically driven means attached to said housing and in electrical connection with said control means for producing audible stimuli to scare unwanted animals.

15. An apparatus for audibly and visually scaring unwanted animals away from designated areas as defined in claim 14, wherein said mechanically driven rotating means comprises at least two elongated arm members having a substantially hollow interior portion, said are members having a plurality of noise producing particulate contained within said substantially hollow portion of said arm members for producing a noise upon rotation of said arm members.

16. An apparatus for audibly and visually scaring unwanted animals away from designated areas as defined in claim 15, wherein said arm members and said noise producing particulate are manufactured from metal.

17. An apparatus for audibly and visually scaring unwanted animals away from designated areas as defined in claim 14, wherein said electrically driven means for producing visual stimuli further comprises at least one intermittently active light source.

18. An apparatus for audibly and visually scaring unwanted animals away from designated areas as defined in claim 14, wherein said electrically driven means for producing audible stimuli comprises at least one electronic beeper.

19. An apparatus for audibly and visually scaring unwanted animals away from designated areas as defined in claim 14, wherein said control means comprises an electrically operated timer in electrical connection with an operation engaging relay.

20. An apparatus for audibly and visually scanning unwanted animals away from designated areas as defined in claim 14, wherein said housing is painted to resemble human features.

21. An apparatus for audibly and visually scaring unwanted animals away from designated areas as defined in claim 14, further comprising a pneumatic gun in electrical connection with said control means for emitting a loud gun sound.

22. An apparatus for audibly and visually scaring unwanted animals away from designated areas as defined in claim 14, wherein said power source is a battery, said battery being in electrical connection with a solar powered battery charger mounted on said housing.

23. An apparatus for audibly and visually scaring unwanted animals away from designated areas as defined in claim 14, wherein said control means intermittently energizes said mechanically driven rotating means, said electrically driven means for producing visual stimuli, and said electrically driven means for producing audible stimuli at predetermined intervals of time.

* * * * *